(12) United States Patent
Sridhar et al.

(10) Patent No.: US 11,909,560 B2
(45) Date of Patent: Feb. 20, 2024

(54) SWITCHING BETWEEN CHANNEL ESTIMATION MODES AT A USER EQUIPMENT

(71) Applicant: QUALCOMM Incorporated, San Diego, CA (US)

(72) Inventors: Abhinav Sridhar, Boston, MA (US); Jae Won Yoo, San Diego, CA (US); Tae Min Kim, San Diego, CA (US); Paolo Minero, La Jolla, CA (US); Ashok Mantravadi, San Diego, CA (US); Hari Sankar, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/302,066

(22) Filed: Apr. 22, 2021

(65) Prior Publication Data
US 2022/0345334 A1 Oct. 27, 2022

(51) Int. Cl.
*H04L 25/02* (2006.01)
*H04B 17/318* (2015.01)
*H04L 5/00* (2006.01)

(52) U.S. Cl.
CPC ....... *H04L 25/0224* (2013.01); *H04B 17/318* (2015.01); *H04L 5/001* (2013.01); *H04L 5/0048* (2013.01); *H04L 25/0256* (2013.01); *H04W 74/0825* (2013.01)

(58) Field of Classification Search
CPC ... H04L 25/0224; H04L 5/001; H04L 5/0048; H04L 25/0256; H04L 25/0204; H04B 17/318; H04B 17/26; H04B 17/364; H04W 74/0825; H04W 52/0216; H04W 52/0245; H04W 52/0258
See application file for complete search history.

(56) References Cited

U.S. PATENT DOCUMENTS

| | | | |
|---|---|---|---|
| 2010/0172399 A1* | 7/2010 | Krishnamurthy | H04B 17/364 375/233 |
| 2012/0106530 A1* | 5/2012 | Drugge | H04L 25/0216 370/338 |
| 2015/0229493 A1* | 8/2015 | Lee | H04L 25/0234 370/252 |
| 2020/0305232 A1* | 9/2020 | Miao | H04W 68/02 |
| 2020/0374821 A1* | 11/2020 | Wu | H04W 56/001 |
| 2021/0058273 A1* | 2/2021 | Yuan | H04L 25/0216 |
| 2021/0083919 A1* | 3/2021 | Ding | H04L 27/2675 |
| 2021/0314198 A1* | 10/2021 | Kwon | H04L 25/0254 |

* cited by examiner

*Primary Examiner* — Justin T Van Roie
(74) *Attorney, Agent, or Firm* — Harrity & Harrity, LLP (57) ABSTRACT

Various aspects of the present disclosure generally relate to wireless communication. In some aspects, a user equipment (UE) may determine an actual power delay profile (PDP) associated with a channel between the UE and a base station, wherein the actual PDP indicates an averaged power level of the channel over a period of time. The UE may determine whether a channel estimation mode switching event is satisfied. The UE may switch, based at least in part on the channel estimation mode switching event being satisfied, between a first channel estimation mode based at least in part on the actual PDP and a second channel estimation mode based at least in part on a template PDP. Numerous other aspects are described.

30 Claims, 6 Drawing Sheets

SWITCHING BETWEEN CHANNEL ESTIMATION MODES AT A USER EQUIPMENT

FIELD OF THE DISCLOSURE

Aspects of the present disclosure generally relate to wireless communication and to techniques and apparatuses for switching between channel estimation modes at a user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of UEs. A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes determining an actual power delay profile (PDP) associated with a channel between the UE and a base station, wherein the actual PDP indicates an averaged power level of the channel over a period of time; determining whether a channel estimation mode switching event is satisfied; and switching, based at least in part on the channel estimation mode switching event being satisfied, between a first channel estimation mode based at least in part on the actual PDP and a second channel estimation mode based at least in part on a template PDP.

In some aspects, a UE for wireless communication includes a memory and one or more processors, coupled to the memory, configured to: determine an actual PDP associated with a channel between the UE and a base station, wherein the actual PDP indicates an averaged power level of the channel over a period of time; determine whether a channel estimation mode switching event is satisfied; and switch, based at least in part on the channel estimation mode switching event being satisfied, between a first channel estimation mode based at least in part on the actual PDP and a second channel estimation mode based at least in part on a template PDP.

In some aspects, a non-transitory computer-readable medium storing a set of instructions for wireless communication includes one or more instructions that, when executed by one or more processors of a UE, cause the UE to: determine an actual PDP associated with a channel between the UE and a base station, wherein the actual PDP indicates an averaged power level of the channel over a period of time; determine whether a channel estimation mode switching event is satisfied; and switch, based at least in part on the channel estimation mode switching event being satisfied, between a first channel estimation mode based at least in part on the actual PDP and a second channel estimation mode based at least in part on a template PDP.

In some aspects, an apparatus for wireless communication includes means for determining an actual PDP associated with a channel between the apparatus and a base station, wherein the actual PDP indicates an averaged power level of the channel over a period of time; means for determining whether a channel estimation mode switching event is satisfied; and means for switching, based at least in part on the channel estimation mode switching event being satisfied, between a first channel estimation mode based at least in part on the actual PDP and a second channel estimation mode based at least in part on a template PDP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
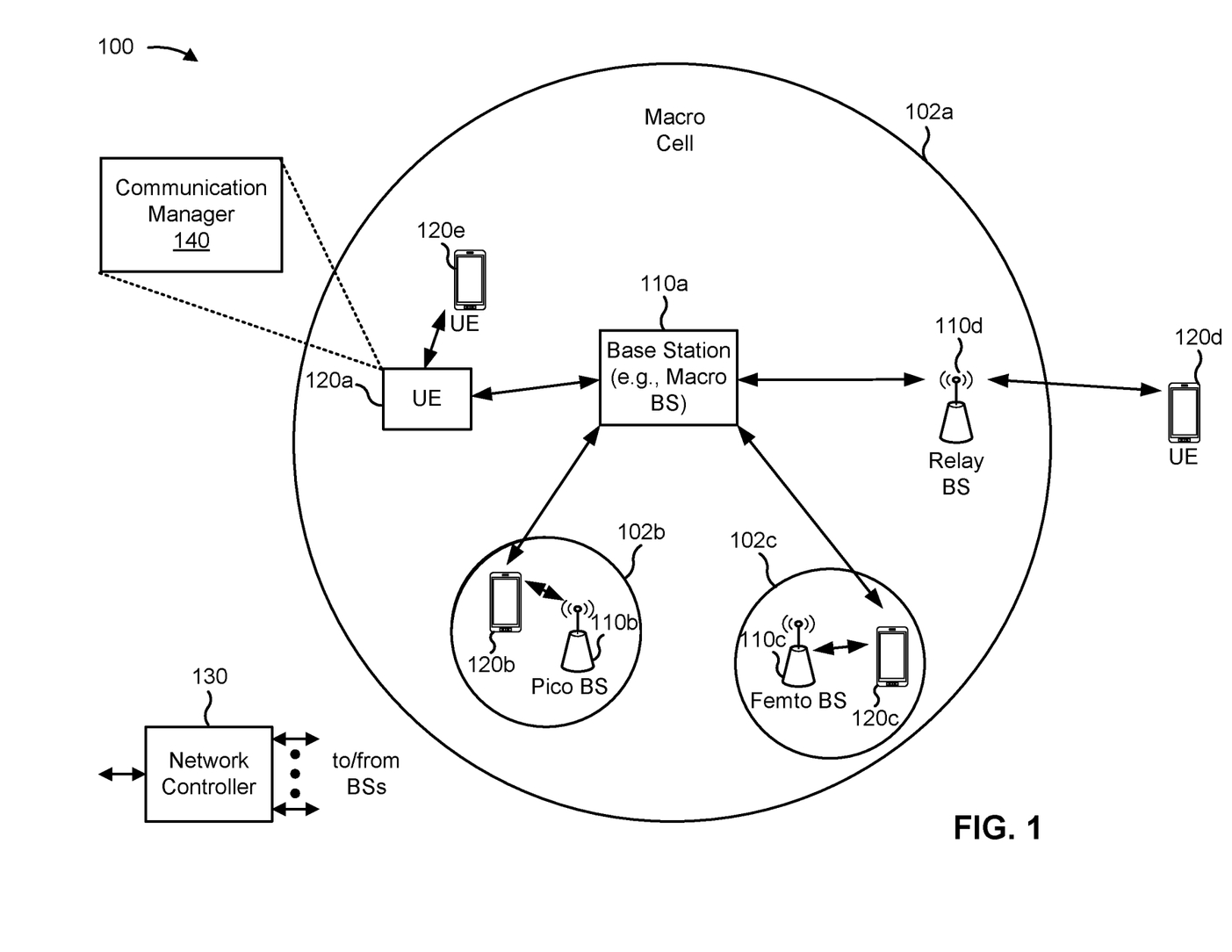
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may determine an actual PDP associated with a channel between the UE 120 and the base station 100, where the actual PDP may indicate an averaged power level of the channel over a period of time. The communication manager 140 may determine whether a channel estimation mode switching event is satisfied. The communication manager 140 may switch, based at least in part on the channel estimation mode switching event being satisfied, between a first channel estimation mode based at least in part on the actual PDP and a second channel estimation mode based at least in part on a template PDP. Additionally, or alternatively, the communication manager 140 may perform one or more other operations described herein.

As indicated above, FIG. 1 is provided as an example. Other examples may differ from what is described with regard to FIG. 1.

Figure 2:
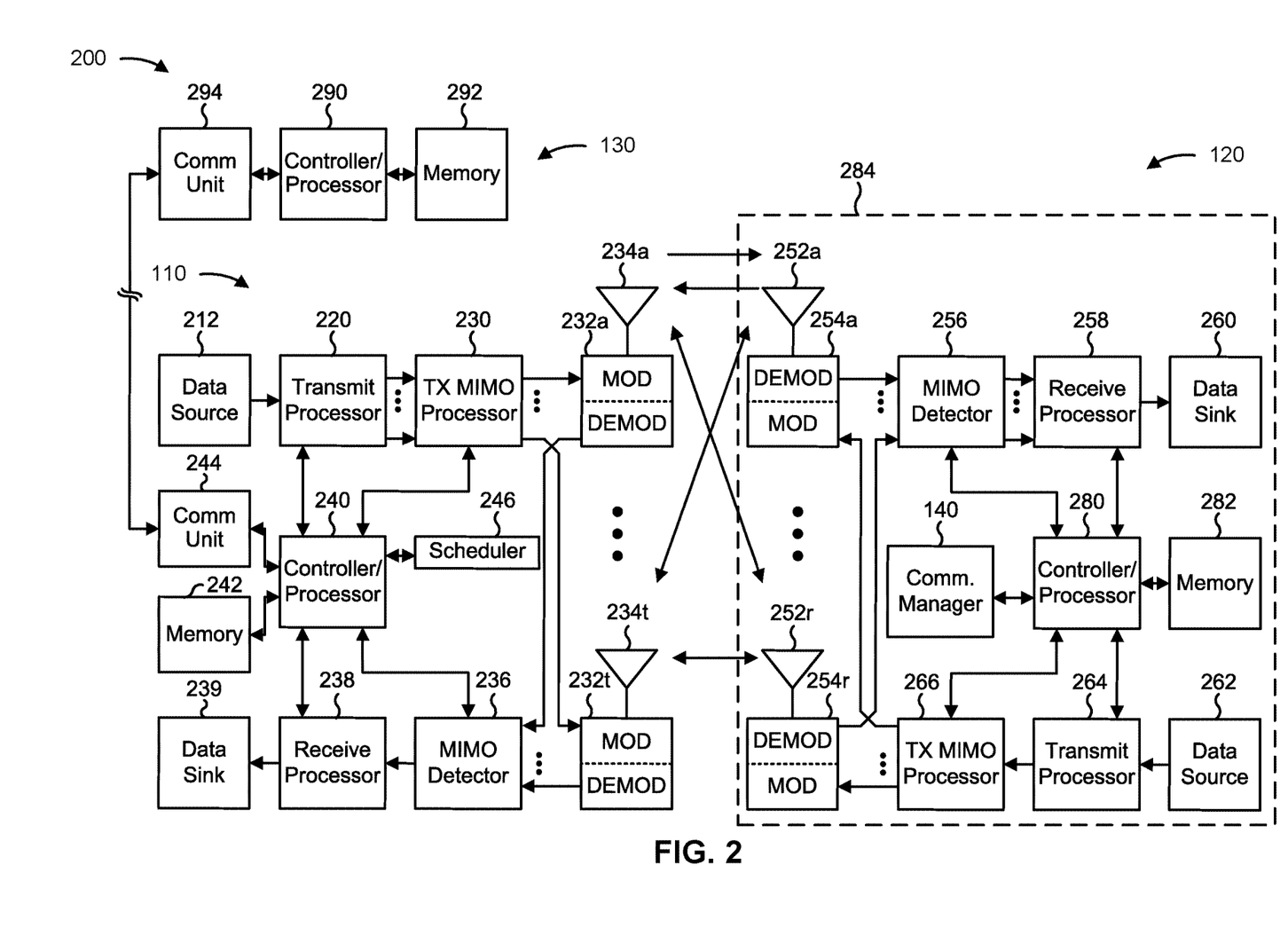
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with switching between channel estimation modes at a UE, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some aspects, executing instructions may include running the instructions, converting the instructions, compiling the instructions, and/or interpreting the instructions, among other examples.

In some aspects, a UE (e.g., UE 120) includes means for determining an actual PDP associated with a channel between the UE and a base station (e.g., base station 110), wherein the actual PDP indicates an averaged power level of the channel over a period of time; means for determining whether a channel estimation mode switching event is satisfied; and/or means for switching, based at least in part on the channel estimation mode switching event being satisfied, between a first channel estimation mode based at least in part on the actual PDP and a second channel estimation mode based at least in part on a template PDP. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Minimum mean square error (MMSE) channel estimation is a channel estimation scheme based at least in part on an estimation of second order channel statistics, such as a power delay profile (PDP). The PDP may indicate a power level of a channel across different instances of time. In other words, the PDP may indicate an averaged power level over a period of time. The PDP may filter out instant fluctuations in power levels of the channel. In NR, a tracking reference signal (TRS) or a synchronization signal block (SSB) may be used to obtain the PDP.

However, in certain cases, an accuracy of the PDP may be degraded. For example, the accuracy of the PDP may be degraded when the PDP is a one-shot PDP estimation. A one-shot PDP estimation (e.g., after a sleep cycle) may not be an averaged power level over a period of time, but rather may be a single power level, which may not accurately represent the power level associated with the channel. As another example, the accuracy of the PDP may be degraded when the PDP is based at least in part on a narrowband SSB. A narrowband SSB based PDP may be less accurate than a TRS-based PDP. In other words, an accuracy of the PDP may be improved when using TRSs as compared to SSBs. As yet another example, the accuracy of the PDP may be degraded at a low signal to noise ratio (SNR), so a lack of sufficient filtering at a low SNR may result in more noise and thereby a less accurate PDP. As yet another example, the accuracy of the PDP may be degraded due to a partial allocation of TRSs in a frequency spectrum, as opposed to a non-partial allocation of TRSs. The partial allocation of the TRSs may result in a less accurate PDP.

Approximate minimum mean square error (AMMSE) channel estimation is a channel estimation scheme that does not utilize an actual PDP when performing a channel estimation. Rather, AMMSE channel estimation may be based at least in part on a template PDP, which may be based at least in part on an assumption of a uniform power across instances of time. The template PDP may be associated with a configurable delay spread. For example, a length of a period of time associated with the template PDP may be based at least in part on the configurable delay spread.

Generally, MMSE channel estimation may be more accurate than AMMSE channel estimation. However, an accuracy of the MMSE channel estimation may be based at least in part on an accuracy of the PDP. When the PDP is relatively accurate, the accuracy of MMSE channel estimation may be greater than an accuracy of AMMSE channel estimation. When the PDP is relatively inaccurate, the accuracy of MMSE channel estimation may be degraded and may be lower than the accuracy of the AMMSE channel estimation.

In certain cases, the accuracy of the PDP may be degraded based at least in part on a one-shot PDP estimation, a narrowband SSB based PDP, a lack of sufficient filtering at a low SNR, and/or a partial allocation of TRS. Since the PDP may be degraded in these cases, the accuracy of the MMSE channel estimation may also be degraded. However, a UE may still be configured to perform MMSE channel estimation, even though the UE may be better suited to perform AMMSE channel estimation in these cases due to the PDP with the degraded accuracy. The UE may not be configured to intelligently switch between MMSE channel estimation and AMMSE channel estimation (which uses the template PDP) depending on an occurrence of an event that degrades the accuracy of the PDP.

In various aspects of techniques and apparatuses described herein, a UE may determine an actual PDP associated with a channel between the UE and a base station. The actual PDP may indicate an averaged power level of the channel over a period of time. The UE may determine whether a channel estimation mode switching event is satisfied. The UE may switch, based at least in part on the channel estimation mode switching event being satisfied, between a first channel estimation mode based at least in part on the actual PDP and a second channel estimation mode based at least in part on a template PDP. The first channel estimation mode associated with the actual PDP may be an MMSE channel estimation mode. The second channel estimation mode associated with the template PDP may be an AMMSE channel estimation mode. In other words, the first channel estimation mode may be an actual PDP based channel estimation mode, and the second channel estimation mode may be a template PDP based channel estimation mode.

As a result, the UE may typically use the first channel estimation mode, which may be more accurate than the second channel estimation mode since the first channel estimation mode is based at least in part on the actual PDP whereas the second channel estimation may be based at least in part on the template PDP. However, when one of the channel estimation mode switching events is satisfied, which may result in a less accurate actual PDP and thereby cause the first channel estimation mode to be less accurate than the second channel estimation mode, the UE may switch from the first channel estimation mode to the second channel estimation mode. By switching to the second channel estimation mode when one of the channel estimation mode switching events is satisfied, the UE may perform a more accurate channel estimation, even though the second channel estimation mode may be based at least in part on the template PDP. When none of the channel estimation mode switching events are satisfied, the UE may switch from the second channel estimation mode back to the first channel estimation mode.

Figure 3:
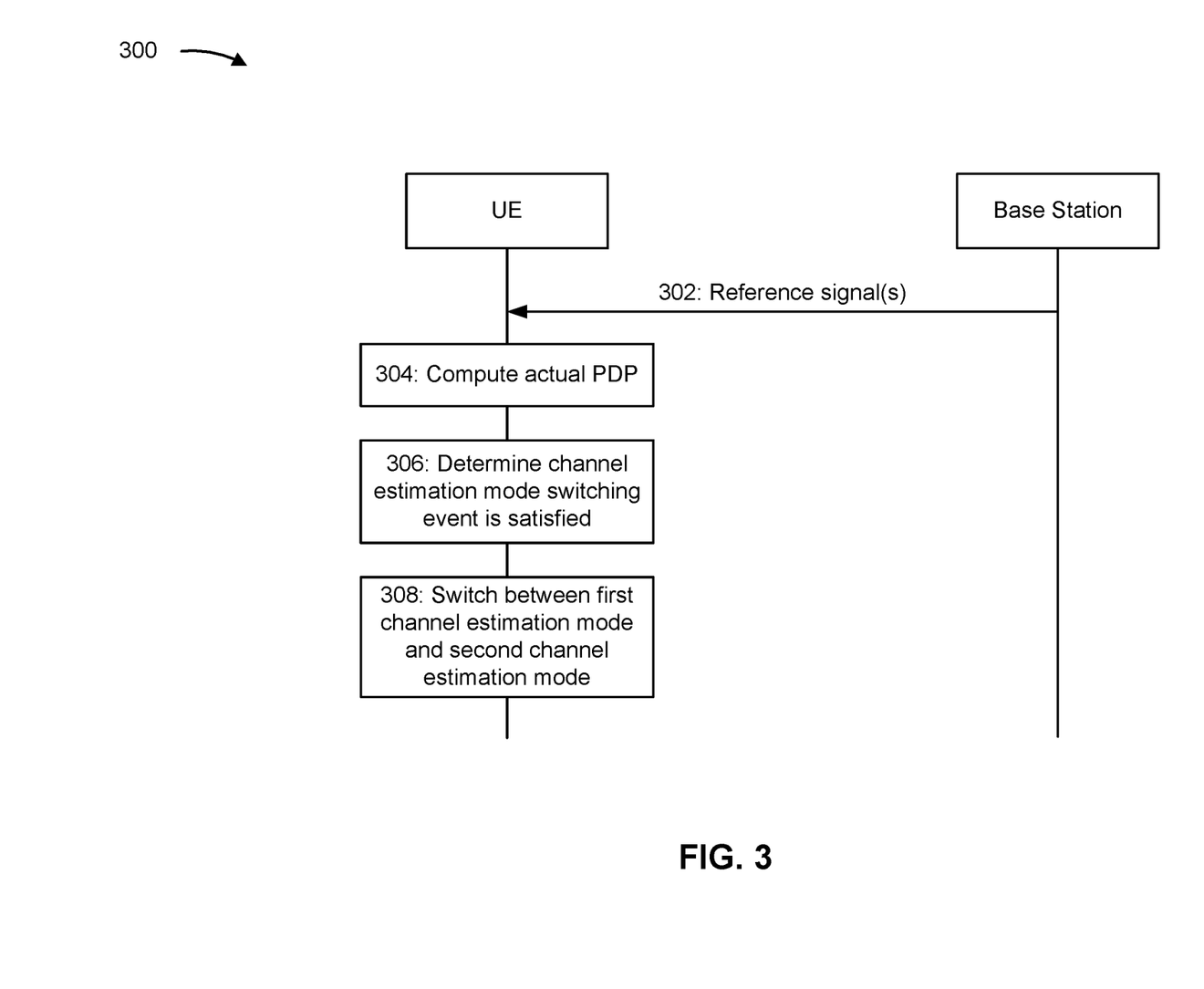
FIGS. 3-4 are diagrams illustrating examples associated with switching between channel estimation modes at a UE, in accordance with the present disclosure.

FIG. 3 is a diagram illustrating an example 300 of switching between channel estimation modes at a UE, in accordance with the present disclosure. As shown in FIG. 3, example 300 includes communication between the UE (e.g., UE 120) and a base station (e.g., base station 110). In some aspects, the UE and the base station may be included in a wireless network such as wireless network 100.

As shown by reference number 302, the UE may receive, from the base station, a plurality of reference signals. The reference signals may be TRSs or SSBs. The reference signals may enable a channel estimation at the UE. In other words, the reference signals may enable the UE to estimate a quality of a channel between the UE and the base station.

As shown by reference number 304, the UE may determine an actual PDP associated with the channel between the UE and the base station. The UE may determine the actual PDP based at least in part on the reference signals (e.g., the TRSs or the SSBs). The actual PDP may indicate an averaged power level of the channel over a period of time. In other words, the actual PDP may filter out instant fluctuations in channel power, as the actual PDP may reflect the averaged power level of the channel over different periods of time.

As shown by reference number 306, the UE may determine whether a channel estimation mode switching event is satisfied. In other words, the UE may determine whether an event associated with a channel estimation mode switching has occurred.

In some aspects, the channel estimation mode switching event may be satisfied when a physical downlink shared channel (PDSCH) allocation size does not satisfy a threshold level. In some aspects, the channel estimation mode switching event may be satisfied based at least in part on a sleep type and a sleep duration during a connected mode discontinuous reception (CDRX) associated with the UE. In some aspects, the channel estimation mode switching event may be satisfied based at least in part on a TRS allocation in a frequency spectrum within a bandwidth part. In some aspects, the channel estimation mode switching event may be satisfied depending on the actual PDP being based at least in part on a TRS or an SSB. In some aspects, the channel estimation mode switching event may be satisfied when an SNR does not satisfy a threshold level. In some aspects, the channel estimation mode switching event may be satisfied based at least in part on a collision detection of reference signals transmitted in neighboring cells. In some aspects, the channel estimation mode switching event may be satisfied based at least in part on an occurrence of a PDP reset event, where the PDP reset event may include a handover or a configuration of another carrier. In some aspects, the channel estimation mode switching event may be satisfied depending on whether the actual PDP is based at least in part on a primary component carrier or a secondary component carrier when the UE is configured for carrier aggregation.

As shown by reference number 308, the UE may switch, based at least in part on the channel estimation mode switching event being satisfied, between a first channel estimation mode and a second channel estimation mode. The first channel estimation mode may be associated with the actual PDP. The first channel estimation mode may use a wideband channel estimation. The first channel estimation mode may be an MMSE channel estimation mode. In some aspects, the second channel estimation mode may be associated with a template PDP. The second channel estimation mode may be associated with the template PDP rather than the actual PDP. The template PDP may be a predetermined PDP or a model PDP based at least in part on historical channel conditions, and may not reflect actual channel conditions between the UE and the base station. The second channel estimation mode may be an AMMSE channel estimation mode. The second channel estimation mode may use a narrowband channel estimation.

In some aspects, the first channel estimation mode may be more accurate than the second channel estimation mode since the first channel estimation mode is based at least in part on the actual PDP, whereas the second channel estimation mode is based at least in part on the template PDP. However, when the channel estimation mode switching event is satisfied, an accuracy level of the actual PDP may be degraded. In these cases, an accuracy level of the first channel estimation mode based at least in part on a degraded actual PDP may be less than an accuracy level of the second channel estimation mode based at least in part on the template PDP. As a result, when the channel estimation mode switching event is satisfied, the UE may switch from the first channel estimation mode to the second channel estimation mode. When the channel estimation mode switching event is no longer satisfied, the UE may switch from the second channel estimation mode back to the first channel estimation mode.

In some aspects, the UE may receive downlink data from the base station over the PDSCH. The base station may transmit the downlink data using a grid of resource blocks. The base station may determine a format associated with a quantity of resource blocks to assign to the UE. When the PDSCH allocation size does not satisfy the threshold level, the UE may fall back to the second channel estimation mode due to an insufficient quantity of tones to perform the first channel estimation mode. In other words, the channel estimation mode switching event may be satisfied when the PDSCH allocation size does not satisfy the threshold level, and the UE may switch from the first channel estimation mode to the second channel estimation mode.

In some aspects, the UE may be configured for CDRX. During CDRX, the UE may be in a sleep state and may periodically wake up to receive a TRS or SSB, or the UE may wake up to receive scheduled data. After waking up from the sleep state, the UE may perform a one-shot PDP estimation. The one-shot PDP estimation may be an averaged power level of the channel over the period of time, in contrast to the actual PDP, and the one-shot PDP estimation may be less accurate than the actual PDP since the one-shot PDP estimation may not filter out instant fluctuations in power levels of the channel. Depending on a sleep type of the sleep state and a duration of the sleep state during the CDRX, the UE may fall back to the second channel estimation mode. The one-shot PDP estimation may degrade an accuracy level of the first channel estimation mode, so the UE may switch to the second channel estimation mode. In other words, the channel estimation mode switching event may be satisfied based at least in part on the sleep type and the sleep duration during the CDRX, and the UE may switch from the first channel estimation mode to the second channel estimation mode.

In some aspects, the UE may determine a TRS allocation within the bandwidth part. The TRSs may not occupy a whole frequency spectrum, and the TRSs may only occupy a few resource blocks, compared to data. When the TRSs occupy fewer resource blocks, an accuracy of the actual PDP may be degraded, so the UE may fall back to the second channel estimation mode. In other words, the channel estimation mode switching event may be satisfied based at least in part on the TRS allocation in the frequency spectrum within the bandwidth part (e.g., the TRS allocation does not satisfy a threshold), and the UE may switch from the first channel estimation mode to the second channel estimation mode.

In some aspects, the UE may determine whether the reference signals received from the base station are TRSs or SSBs. An accuracy level of the actual PDP may be less when based at least in part on SSBs as compared to TRSs, so when the UE determines that the reference signals are SSBs, the UE may fall back to the second channel estimation mode. When the UE determines that the reference signals are TRSs, the UE may use the first channel estimation mode. In other words, the channel estimation mode switching event may be satisfied based at least in part on the actual PDP being based at least in part on SSBs, and the UE may switch from the first channel estimation mode to the second channel estimation mode.

In some aspects, the UE may determine an SNR associated with the reference signals, or a reference signal SNR regime. An accuracy level of the actual PDP may be degraded at a low SNR as compared to a high SNR. When the SNR is relatively low, a quality of the PDP may be relatively low, so the UE may fall back to the second channel estimation mode. In other words, the channel estimation mode switching event may be satisfied when the SNR does not satisfy a threshold level, and the UE may switch from the first channel estimation mode to the second channel estimation mode.

In some aspects, the UE may determine whether a collision is detected from neighboring cells. In some cases, the neighboring cells may also transmit reference signals in the same symbols as compared to the UE, which may cause a TRS/SSB collision or interference with the neighboring cells. The UE may fall back to the second channel estimation mode based at least in part on a collision detection. In other words, the channel estimation mode switching event may be satisfied based at least in part on the collision detection of the reference signals transmitted in neighboring cells, and the UE may switch from the first channel estimation mode to the second channel estimation mode.

In some aspects, the UE may determine whether a PDP reset event has occurred. The PDP reset event may be based at least in part on a handover of the UE, or based at least in part on another carrier being configured for the UE, which may cause a current PDP to no longer be reliable. When the UE detects that the PDP reset event has occurred, the UE may fall back to the second channel estimation mode. After a period of time, the UE may switch back to the first channel estimation mode. In other words, the channel estimation mode switching event may be satisfied based at least in part on the occurrence of the PDP reset event, and the UE may switch from the first channel estimation mode to the second channel estimation mode.

In some aspects, the UE may determine whether the actual PDP is based at least in part on a primary component carrier or a secondary component carrier, when the UE is configured for carrier aggregation. For intra-band carrier aggregations, carriers may be contiguous and may be associated with similar channel statistics. Depending on whether a source of the actual PDP is from the primary component carrier or the secondary component carrier and whether the carrier aggregation is intra-band or inter-band, the UE may fall back to the second channel estimation mode. For example, the UE may use the actual PDP based at least in part on the primary component carrier for the first channel estimation mode, and the UE may use the actual PDP based at least in part on the primary component carrier for the secondary component carrier when channel conditions are similar between the primary component carrier and the secondary component carrier. The channel estimation mode switching event may be satisfied depending on whether the actual PDP is based at least in part on the primary component carrier or the secondary component carrier when the UE is configured for carrier aggregation, and the UE may switch from the first channel estimation mode to the second channel estimation mode.

As indicated above, FIG. 3 is provided as an example. Other examples may differ from what is described with regard to FIG. 3.

Figure 4:
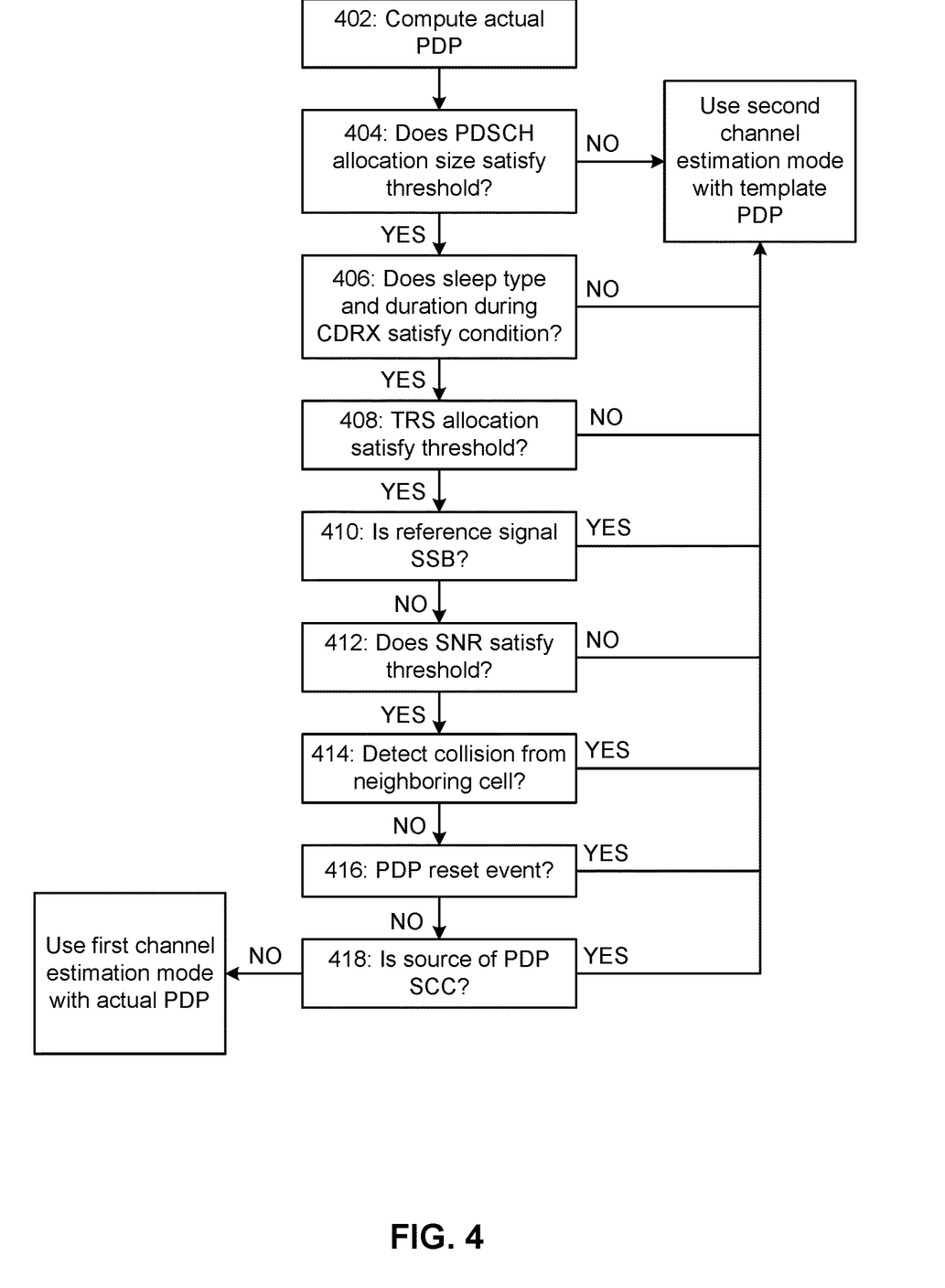

FIG. 4 is a diagram illustrating an example 400 of switching between channel estimation modes at a UE, in accordance with the present disclosure.

As shown by reference number 402, a UE (e.g., UE 120) may compute an actual PDP. As shown by reference number 404, the UE may determine whether a PDSCH allocation size satisfies a threshold. When the PDSCH allocation size does not satisfy the threshold, the UE may use a second channel estimation mode based at least in part on a template PDP. When the UE determines that the PDSCH allocation does satisfy the threshold, as shown by reference number 406, the UE may determine whether a sleep type and/or a sleep duration during a CDRX satisfies a condition. When the sleep type and/or the sleep duration during the CDRX does not satisfy the condition, the UE may use the second channel estimation mode based at least in part on the template PDP. When the UE determines that the sleep type and/or the sleep duration during the CDRX does satisfy the condition, as shown by reference number 408, the UE may determine whether a TRS allocation satisfies a threshold. When the UE determines that the TRS allocation does not satisfy the threshold, the UE may use the second channel estimation mode based at least in part on the template PDP.

When the UE determines that the TRS allocation satisfies the threshold, as shown by reference number 410, the UE may determine whether a reference signal received from a base station is an SSB. When the UE determines that the reference signal is an SSB, the UE may use the second channel estimation mode based at least in part on the template PDP. When the UE determines that the reference signal is not an SSB, as shown by reference number 412, the UE may determine whether an SNR satisfies a threshold. When the UE determines that the SNR does not satisfy the threshold, the UE may use the second channel estimation mode based at least in part on the template PDP. When the UE determines that the SNR satisfies the threshold, as shown by reference number 414, the UE may determine whether a collision is detected from a neighboring cell. When the UE determines that the collision is detected from the neighboring cell, the UE may use the second channel estimation mode based at least in part on the template PDP. When the UE determines that no collision is detected from the neighboring cell, as shown by reference number 416, the UE may determine an occurrence of a PDP reset event. When the UE determines that a PDP reset event has occurred, the UE may use the second channel estimation mode based at least in part on the template PDP. When the UE determines that a PDP reset event has not occurred, as shown by reference number 418, the UE may determine whether a source of the PDP is a secondary component carrier. When the UE determines that the source of the PDP is the secondary component carrier, the UE may use the second channel estimation mode based at least in part on the template PDP. When the UE determines that the source of the PDP is not the secondary component carrier, the UE may use a first channel estimation mode based at least in part on the actual PDP.

In some aspects, the UE may determine whether a series of events are satisfied. Depending on whether the events are satisfied or not satisfied, the UE may use the second channel estimation mode based at least in part on the template PDP or the first channel estimation mode based at least in part on the actual PDP.

As indicated above, FIG. 4 is provided as an example. Other examples may differ from what is described with regard to FIG. 4.

Figure 5:
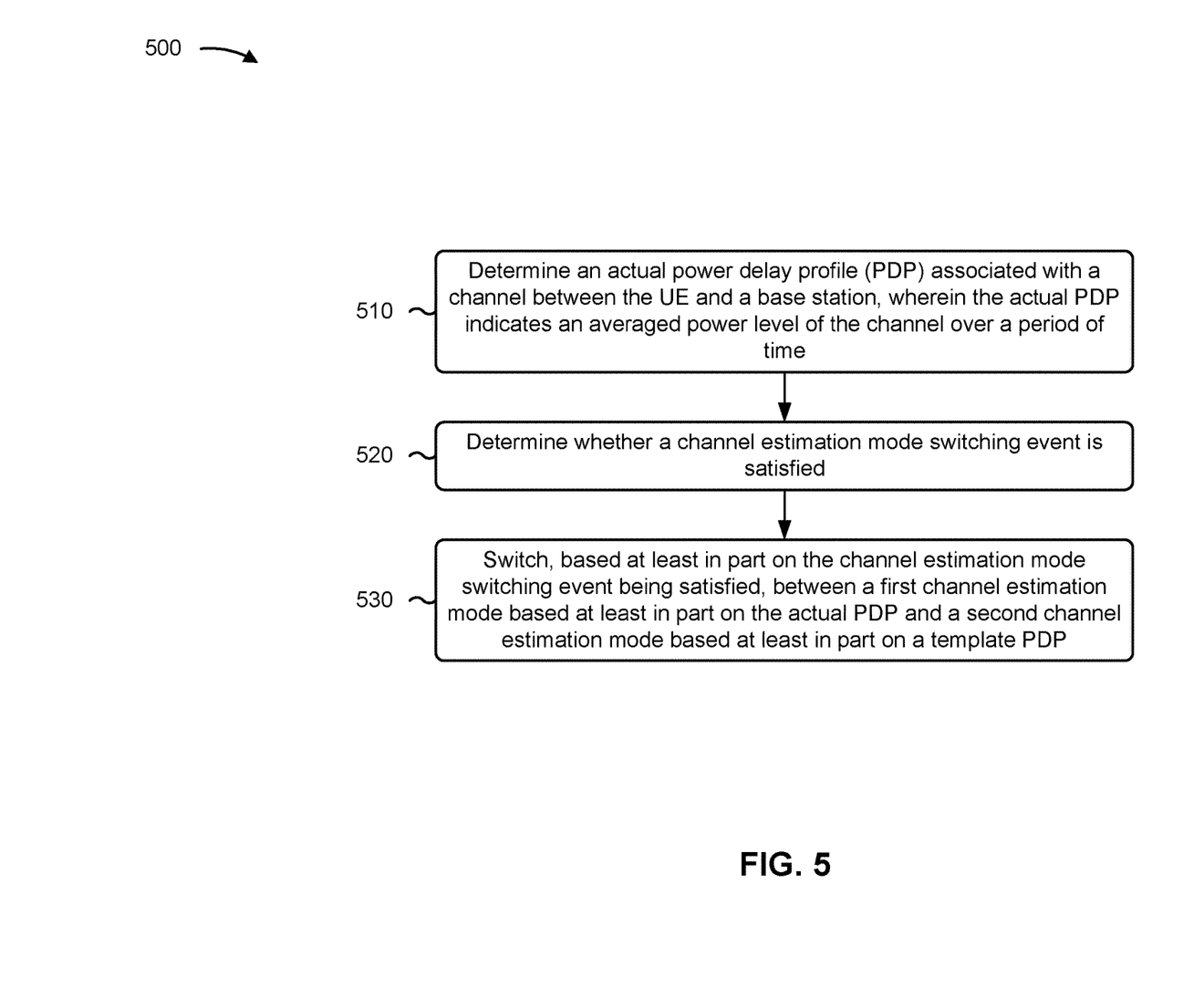
FIG. 5 is a diagram illustrating an example process associated with switching between channel estimation modes at a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with switching between channel estimation modes at a.

As shown in FIG. 5, in some aspects, process 500 may include determining an actual PDP associated with a channel between the UE and a base station, wherein the actual PDP indicates an averaged power level of the channel over a period of time (block 510). For example, the UE (e.g., using determination component 608, depicted in FIG. 6) may determine an actual PDP associated with a channel between the UE and a base station, wherein the actual PDP indicates an averaged power level of the channel over a period of time, as described above.

As further shown in FIG. 5, in some aspects, process 500 may include determining whether a channel estimation mode switching event is satisfied (block 520). For example, the UE (e.g., using determination component 608, depicted in FIG. 6) may determine whether a channel estimation mode switching event is satisfied, as described above.

As further shown in FIG. 5, in some aspects, process 500 may include switching, based at least in part on the channel estimation mode switching event being satisfied, between a first channel estimation mode based at least in part on the actual PDP and a second channel estimation mode based at least in part on a template PDP (block 530). For example, the UE (e.g., using switching component 610, depicted in FIG. 6) may switch, based at least in part on the channel estimation mode switching event being satisfied, between a first channel estimation mode based at least in part on the actual PDP and a second channel estimation mode based at least in part on a template PDP, as described above.

Process 500 may include additional aspects, such as any single aspect or any combination of aspects described below and/or in connection with one or more other processes described elsewhere herein.

In a first aspect, the first channel estimation mode associated with the actual PDP is an MMSE channel estimation mode, and the second channel estimation mode associated with the template PDP is an AMMSE channel estimation mode.

In a second aspect, alone or in combination with the first aspect, determining the actual PDP associated with the channel is based at least in part on a reference signal received from the base station, wherein the reference signal is one of a TRS or an SSB.

In a third aspect, alone or in combination with one or more of the first and second aspects, the channel estimation mode switching event is satisfied when a PDSCH allocation size does not satisfy a threshold level.

In a fourth aspect, alone or in combination with one or more of the first through third aspects, the channel estimation mode switching event is satisfied based at least in part on a sleep type and a sleep duration during a CDRX.

In a fifth aspect, alone or in combination with one or more of the first through fourth aspects, the channel estimation mode switching event is satisfied based at least in part on a TRS allocation in a frequency spectrum within a bandwidth part.

In a sixth aspect, alone or in combination with one or more of the first through fifth aspects, the channel estimation mode switching event is satisfied depending on the actual PDP being based at least in part on a TRS or an SSB.

In a seventh aspect, alone or in combination with one or more of the first through sixth aspects, the channel estimation mode switching event is satisfied when an SNR does not satisfy a threshold level.

In an eighth aspect, alone or in combination with one or more of the first through seventh aspects, the channel estimation mode switching event is satisfied based at least in part on a collision detection of reference signals transmitted in neighboring cells.

In a ninth aspect, alone or in combination with one or more of the first through eighth aspects, the channel estimation mode switching event is satisfied based at least in part on an occurrence of a PDP reset event, wherein the PDP reset event includes a handover or a configuration of another carrier.

In a tenth aspect, alone or in combination with one or more of the first through ninth aspects, the channel estimation mode switching event is satisfied depending on whether the actual PDP is based at least in part on a primary component carrier or a secondary component carrier when the UE is configured for carrier aggregation.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
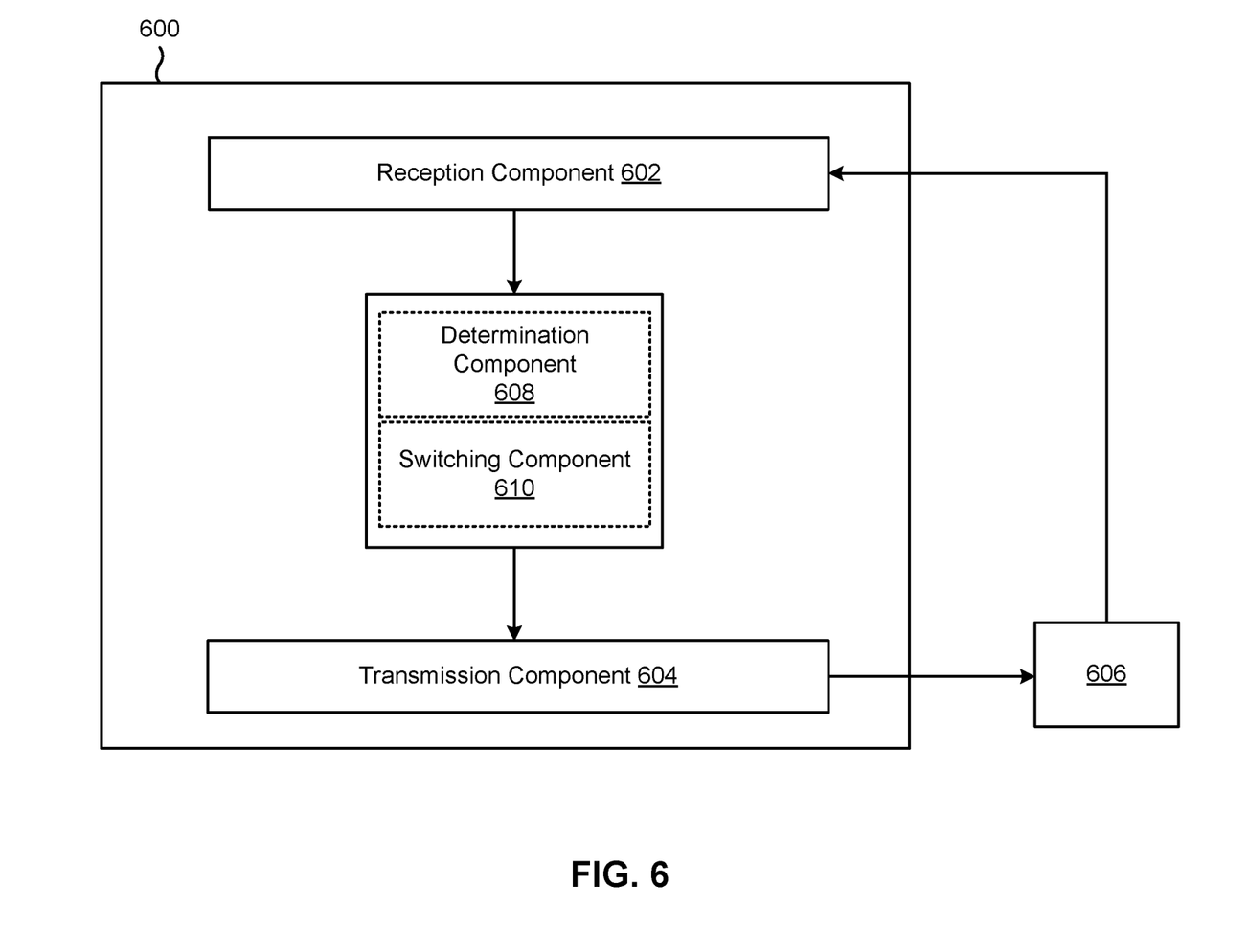
FIG. 6 is a block diagram of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a determination component 608, or a switching component 610, among other examples.

In some aspects, the apparatus 600 may be configured to perform one or more operations described herein in connection with FIGS. 3-4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The determination component 608 may determine an actual PDP associated with a channel between the UE and a base station, wherein the actual PDP indicates an averaged power level of the channel over a period of time. The determination component 608 may determine whether a channel estimation mode switching event is satisfied. The switching component 610 may switch, based at least in part on the channel estimation mode switching event being satisfied, between a first channel estimation mode based at least in part on the actual PDP and a second channel estimation mode based at least in part on a template PDP.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: determining an actual power delay profile (PDP) associated with a channel between the UE and a base station, wherein the actual PDP indicates an averaged power level of the channel over a period of time; determining whether a channel estimation mode switching event is satisfied; and switching, based at least in part on the channel estimation mode switching event being satisfied, between a first channel estimation mode based at least in part on the actual PDP and a second channel estimation mode based at least in part on a template PDP.

Aspect 2: The method of Aspect 1, wherein: the first channel estimation mode associated with the actual PDP is a minimum mean square error channel estimation mode; and the second channel estimation mode associated with the template PDP is an approximate minimum mean square error channel estimation mode.

Aspect 3: The method of any of Aspects 1 through 2, wherein determining the actual PDP associated with the channel is based at least in part on a reference signal received from the base station, wherein the reference signal is one of a tracking reference signal or a synchronization signal block.

Aspect 4: The method of any of Aspects 1 through 3, wherein the channel estimation mode switching event is satisfied when a physical downlink shared channel allocation size does not satisfy a threshold level.

Aspect 5: The method of any of Aspects 1 through 4, wherein the channel estimation mode switching event is satisfied based at least in part on a sleep type and a sleep duration during a connected mode discontinuous reception.

Aspect 6: The method of any of Aspects 1 through 5, wherein the channel estimation mode switching event is satisfied based at least in part on a tracking reference signal allocation in a frequency spectrum within a bandwidth part.

Aspect 7: The method of any of Aspects 1 through 6, wherein the channel estimation mode switching event is satisfied depending on the actual PDP being based at least in part on a tracking reference signal or a synchronization signal block.

Aspect 8: The method of any of Aspects 1 through 7, wherein the channel estimation mode switching event is satisfied when a signal-to-noise ratio does not satisfy a threshold level.

Aspect 9: The method of any of Aspects 1 through 8, wherein the channel estimation mode switching event is satisfied based at least in part on a collision detection of reference signals transmitted in neighboring cells.

Aspect 10: The method of any of Aspects 1 through 9, wherein the channel estimation mode switching event is satisfied based at least in part on an occurrence of a PDP reset event, wherein the PDP reset event includes a handover or a configuration of another carrier.

Aspect 11: The method of any of Aspects 1 through 10, wherein the channel estimation mode switching event is satisfied depending on whether the actual PDP is based at least in part on a primary component carrier or a secondary component carrier when the UE is configured for carrier aggregation.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the memory and the one or more processors configured to perform the method of one or more of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining an actual power delay profile (PDP) associated with a channel between the UE and a network node, wherein the actual PDP indicates an averaged power level of the channel over a period of time;
    determining whether a channel estimation mode switching event is satisfied; and
    switching, based at least in part on the channel estimation mode switching event being satisfied, between a first channel estimation mode based at least in part on the actual PDP and a second channel estimation mode based at least in part on a template PDP,
        wherein the first channel estimation mode is more accurate than the second channel estimation mode before switching, and the second channel estimation mode is more accurate than the first channel estimation mode after the switching.

2. The method of claim 1, wherein:
    the first channel estimation mode associated with the actual PDP is a minimum mean square error channel estimation mode; and
    the second channel estimation mode associated with the template PDP is an approximate minimum mean square error channel estimation mode.

3. The method of claim 1, wherein determining the actual PDP associated with the channel is based at least in part on a reference signal received from the network node, wherein the reference signal is one of a tracking reference signal or a synchronization signal block.

4. The method of claim 1, wherein the channel estimation mode switching event is satisfied when a physical downlink shared channel allocation size does not satisfy a threshold level.

5. The method of claim 1, wherein the channel estimation mode switching event is satisfied based at least in part on a sleep type and a sleep duration during a connected mode discontinuous reception.

6. The method of claim 1, wherein the channel estimation mode switching event is satisfied based at least in part on a tracking reference signal allocation in a frequency spectrum within a bandwidth part.

7. The method of claim 1, wherein the channel estimation mode switching event is satisfied depending on the actual PDP being based at least in part on a tracking reference signal or a synchronization signal block.

8. The method of claim 1, wherein the channel estimation mode switching event is satisfied when a signal-to-noise ratio does not satisfy a threshold level.

9. The method of claim 1, wherein the channel estimation mode switching event is satisfied based at least in part on a collision detection of reference signals transmitted in neighboring cells.

10. The method of claim 1, wherein the channel estimation mode switching event is satisfied based at least in part on an occurrence of a PDP reset event, wherein the PDP reset event includes a handover or a configuration of another carrier.

11. The method of claim 1, wherein the channel estimation mode switching event is satisfied depending on whether the actual PDP is based at least in part on a primary component carrier or a secondary component carrier when the UE is configured for carrier aggregation.

12. A user equipment (UE) for wireless communication, comprising:
a memory; and
one or more processors, coupled to the memory, configured to:
determine an actual power delay profile (PDP) associated with a channel between the UE and a network node, wherein the actual PDP indicates an averaged power level of the channel over a period of time;
determine whether a channel estimation mode switching event is satisfied; and
switch, based at least in part on the channel estimation mode switching event being satisfied, between a first channel estimation mode based at least in part on the actual PDP and a second channel estimation mode based at least in part on a template PDP,
wherein the first channel estimation mode is more accurate than the second channel estimation mode before switching, and the second channel estimation mode is more accurate than the first channel estimation mode after the switching.

13. The UE of claim 12, wherein:
the first channel estimation mode associated with the actual PDP is a minimum mean square error channel estimation mode; and
the second channel estimation mode associated with the template PDP is an approximate minimum mean square error channel estimation mode.

14. The UE of claim 12, wherein the one or more processors, when determining the actual PDP associated with the channel, are configured to determine the actual PDP based at least in part on a reference signal received from the network node, wherein the reference signal is one of a tracking reference signal or a synchronization signal block.

15. The UE of claim 12, wherein the channel estimation mode switching event is satisfied when a physical downlink shared channel allocation size does not satisfy a threshold level.

16. The UE of claim 12, wherein the channel estimation mode switching event is satisfied based at least in part on a sleep type and a sleep duration during a connected mode discontinuous reception.

17. The UE of claim 12, wherein the channel estimation mode switching event is satisfied based at least in part on a tracking reference signal allocation in a frequency spectrum within a bandwidth part.

18. The UE of claim 12, wherein the channel estimation mode switching event is satisfied depending on the actual PDP being based at least in part on a tracking reference signal or a synchronization signal block.

19. The UE of claim 12, wherein the channel estimation mode switching event is satisfied when a signal-to-noise ratio does not satisfy a threshold level.

20. The UE of claim 12, wherein the channel estimation mode switching event is satisfied based at least in part on a collision detection of reference signals transmitted in neighboring cells.

21. The UE of claim 12, wherein the channel estimation mode switching event is satisfied based at least in part on an occurrence of a PDP reset event, wherein the PDP reset event includes a handover or a configuration of another carrier.

22. The UE of claim 12, wherein the channel estimation mode switching event is satisfied depending on whether the actual PDP is based at least in part on a primary component carrier or a secondary component carrier when the UE is configured for carrier aggregation.

23. A non-transitory computer-readable medium storing a set of instructions for wireless communication, the set of instructions comprising:
one or more instructions that, when executed by one or more processors of a user equipment (UE), cause the UE to:
determine an actual power delay profile (PDP) associated with a channel between the UE and a network node, wherein the actual PDP indicates an averaged power level of the channel over a period of time;
determine whether a channel estimation mode switching event is satisfied; and
switch, based at least in part on the channel estimation mode switching event being satisfied, between a first channel estimation mode based at least in part on the actual PDP and a second channel estimation mode based at least in part on a template PDP,
wherein the first channel estimation mode is more accurate than the second channel estimation mode before switching, and the second channel estimation mode is more accurate than the first channel estimation mode after the switching.

24. The non-transitory computer-readable medium of claim 23, wherein:
the first channel estimation mode associated with the actual PDP is a minimum mean square error channel estimation mode; and
the second channel estimation mode associated with the template PDP is an approximate minimum mean square error channel estimation mode.

25. The non-transitory computer-readable medium of claim 23, wherein:
- the channel estimation mode switching event is satisfied when a physical downlink shared channel allocation size does not satisfy a threshold level;
- the channel estimation mode switching event is satisfied based at least in part on a sleep type and a sleep duration during a connected mode discontinuous reception;
- the channel estimation mode switching event is satisfied based at least in part on a tracking reference signal allocation in a frequency spectrum within a bandwidth part; or
- the channel estimation mode switching event is satisfied depending on the actual PDP being based at least in part on a tracking reference signal or a synchronization signal block.

26. The non-transitory computer-readable medium of claim 23, wherein:
- the channel estimation mode switching event is satisfied when a signal-to-noise ratio does not satisfy a threshold level;
- the channel estimation mode switching event is satisfied based at least in part on a collision detection of reference signals transmitted in neighboring cells;
- the channel estimation mode switching event is satisfied based at least in part on an occurrence of a PDP reset event, wherein the PDP reset event includes a handover or a configuration of another carrier; or
- the channel estimation mode switching event is satisfied depending on whether the actual PDP is based at least in part on a primary component carrier or a secondary component carrier when the UE is configured for carrier aggregation.

27. An apparatus for wireless communication, comprising:
- means for determining an actual power delay profile (PDP) associated with a channel between the apparatus and a network node, wherein the actual PDP indicates an averaged power level of the channel over a period of time;
- means for determining whether a channel estimation mode switching event is satisfied; and
- means for switching, based at least in part on the channel estimation mode switching event being satisfied, between a first channel estimation mode based at least in part on the actual PDP and a second channel estimation mode based at least in part on a template PDP, wherein the first channel estimation mode is more accurate than the second channel estimation mode before switching, and the second channel estimation mode is more accurate than the first channel estimation mode after the switching.

28. The apparatus of claim 27, wherein:
the first channel estimation mode associated with the actual PDP is a minimum mean square error channel estimation mode; and
the second channel estimation mode associated with the template PDP is an approximate minimum mean square error channel estimation mode.

29. The apparatus of claim 27, wherein:
- the channel estimation mode switching event is satisfied when a physical downlink shared channel allocation size does not satisfy a threshold level;
- the channel estimation mode switching event is satisfied based at least in part on a sleep type and a sleep duration during a connected mode discontinuous reception;
- the channel estimation mode switching event is satisfied based at least in part on a tracking reference signal allocation in a frequency spectrum within a bandwidth part; or
- the channel estimation mode switching event is satisfied depending on the actual PDP being based at least in part on a tracking reference signal or a synchronization signal block.

30. The apparatus of claim 27, wherein:
- the channel estimation mode switching event is satisfied when a signal-to-noise ratio does not satisfy a threshold level;
- the channel estimation mode switching event is satisfied based at least in part on a collision detection of reference signals transmitted in neighboring cells;
- the channel estimation mode switching event is satisfied based at least in part on an occurrence of a PDP reset event, wherein the PDP reset event includes a handover or a configuration of another carrier; or
- the channel estimation mode switching event is satisfied depending on whether the actual PDP is based at least in part on a primary component carrier or a secondary component carrier when the apparatus is configured for carrier aggregation.

\* \* \* \* \*